US012598251B2

(12) United States Patent
Rodriguez Bravo et al.

(10) Patent No.: US 12,598,251 B2
(45) Date of Patent: Apr. 7, 2026

(54) PREVENTING DEEP FAKE VOICEMAIL SCAMS

(71) Applicant: Kyndryl, Inc., New York, NY (US)

(72) Inventors: Cesar Augusto Rodriguez Bravo, Alajuela (CR); Lorie Goins, Pinehurst, NC (US)

(73) Assignee: Kyndryl, Inc., New York, NY (US)

( * ) Notice: Subject to any disclaimer, the term of this patent is extended or adjusted under 35 U.S.C. 154(b) by 288 days.

(21) Appl. No.: 18/458,276

(22) Filed: Aug. 30, 2023

(65) Prior Publication Data

US 2025/0080646 A1     Mar. 6, 2025

(51) Int. Cl.
*H04M 3/22*     (2006.01)
*H04M 3/436*     (2006.01)
*H04M 3/533*     (2006.01)

(52) U.S. Cl.
CPC ......... *H04M 3/2281* (2013.01); *H04M 3/436* (2013.01); *H04M 3/5335* (2013.01); *H04M 2203/6027* (2013.01)

(58) Field of Classification Search
None
See application file for complete search history.

(56) References Cited

U.S. PATENT DOCUMENTS 10,110,738 B1 * 10/2018 Sawant .................. G06N 3/044
10,455,085 B1 * 10/2019 Roundy ................ H04W 12/12

11,463,582 B1 * 10/2022 Serban ..................... G06N 3/08
2014/0379812 A1 * 12/2014 Bastide, II ............ H04L 51/212
709/206
2017/0134574 A1   5/2017 Winkler
2017/0142252 A1 *  5/2017 Bhupati .............. H04M 3/2281
2018/0240028 A1 *  8/2018 Baracaldo Angel ..... G06N 5/02
2018/0294959 A1   10/2018 Traynor et al.
2020/0067861 A1 *  2/2020 Leddy .................. G06F 21/6245
2022/0046053 A1   2/2022 Stolarz et al.
2022/0060579 A1   2/2022 Quilici et al.
2022/0294902 A1 *  9/2022 Soryal ................... H04M 3/493
2023/0015189 A1   1/2023 Looney et al.
2023/0048264 A1   2/2023 Hoste et al.
2023/0262159 A1 *  8/2023 Majdabadi .......... H04M 3/2281
379/201.02
2024/0031482 A1 *  1/2024 Matias .............. H04M 3/42042
2024/0040035 A1 *  2/2024 Dropuljic .............. G10L 15/005

OTHER PUBLICATIONS

Agarwal et al., "LIDSNet: A Lightweight on-device Intent Detection model using Deep Siamese Network," arXiv:2110.15717v1, Oct. 6, 2021, 6 pages.
Bateman, Cyber Policy Initiative Working Paper Series, Cybersecurity and the Financial System #7, Jul. 2020, 52 pages.

(Continued)

*Primary Examiner* — Quoc D Tran
(74) *Attorney, Agent, or Firm* — CANTOR COLBURN LLP; Erik Swanson

(57) ABSTRACT

Embodiments relate to preventing deep fake voicemail scams. In response to receiving a voice message, an intent of the voice message is determined. The intent is determined to relate to a persuasion technique. A warning is provided about the voice message.

19 Claims, 10 Drawing Sheets

(56)     References Cited

OTHER PUBLICATIONS

Lin et al., "Selective In-Context Data Augmentation for Intent Detection using Pointwise V-Information," arXiv:2302.05096v1, Feb. 10, 2023, 14 pages.

Liu et al., "Attention-Based Recurrent Neural Network Models for Joint Intent Detection and Slot Filling," arXiv:1609.01454v1, Sep. 6, 2016, 5 pages.

Liu et al., "Joint Online Spoken Language Understanding and Language Modeling with Recurrent Neural Networks," arXiv:1609.01462v1, Sep. 6, 2016, 9 pages.

Niu et al., "A Novel Bi-directional Interrelated Model for Joint Intent Detection and Slot Filling," arXiv:1907.00390v1, Jun. 30, 2019, 5 pages.

Obuchowski, "Transformer-Capsule Model for Intent Detection," Thirty-Fourth AAAI Conference on Artificial Intelligence, 2020, pp. 13885-13886.

Qin et al., "GL-GIN: Fast and Accurate Non-Autoregressive Model for Joint Multiple Intent Detection and Slot Filling," arXiv:2106.01925v1, Jun. 3, 2021, 11 pages.

Rafiepour et al., "CTRAN: CNN—Transformer-based Network for Natural Language Understanding," arXiv:2303.10606v1, Mar. 19, 2023, pp. 1-23.

Vacar, "Deep fake voicemail scam exploding," FOX KTVU, Mar. 6, 2023, 2 pages.

* cited by examiner

100

Mass Storage 110

Software 111

Hard Disk 108

I/O Adapter 106

System Memory 103

RAM 105

ROM 104

CPU 101a

CPU 101b

CPU 101c

101

Communications Adapter 107

Network 112

System Bus 102

Interface Adapter 116

Display Adapter 115

Display 119

Microphone 124

Speaker 123

Mouse 122

Keyboard 121

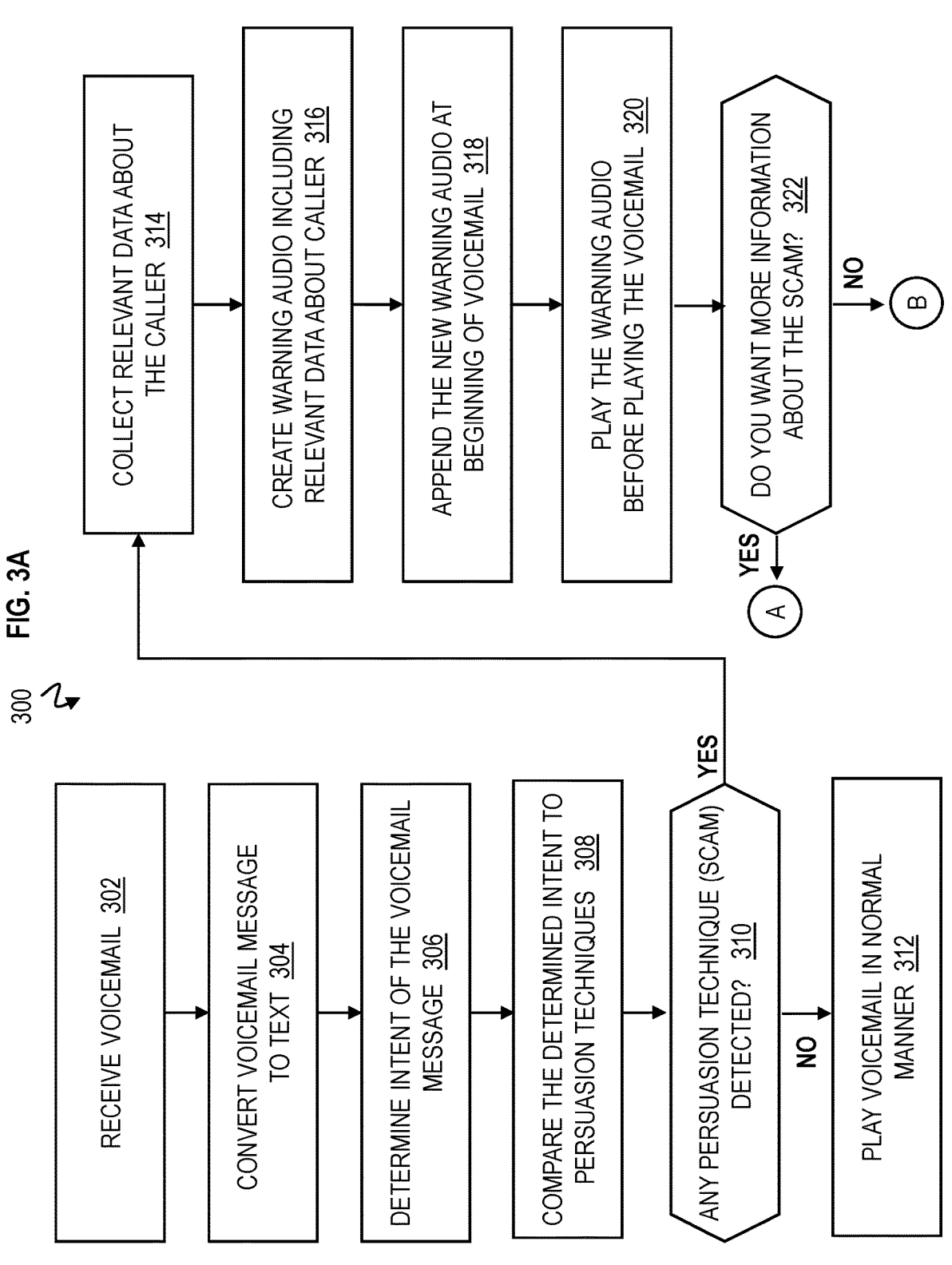

COLLECT RELEVANT DATA ABOUT THE CALLER 314

CREATE WARNING AUDIO INCLUDING RELEVANT DATA ABOUT CALLER 316

APPEND THE NEW WARNING AUDIO AT BEGINNING OF VOICEMAIL 318

PLAY THE WARNING AUDIO BEFORE PLAYING THE VOICEMAIL 320

DO YOU WANT MORE INFORMATION ABOUT THE SCAM? 322

YES → A

NO → B

RECEIVE VOICEMAIL 302

CONVERT VOICEMAIL MESSAGE TO TEXT 304

DETERMINE INTENT OF THE VOICEMAIL MESSAGE 306

COMPARE THE DETERMINED INTENT TO PERSUASION TECHNIQUES 308

ANY PERSUASION TECHNIQUE (SCAM) DETECTED? 310

YES

NO → PLAY VOICEMAIL IN NORMAL MANNER 312

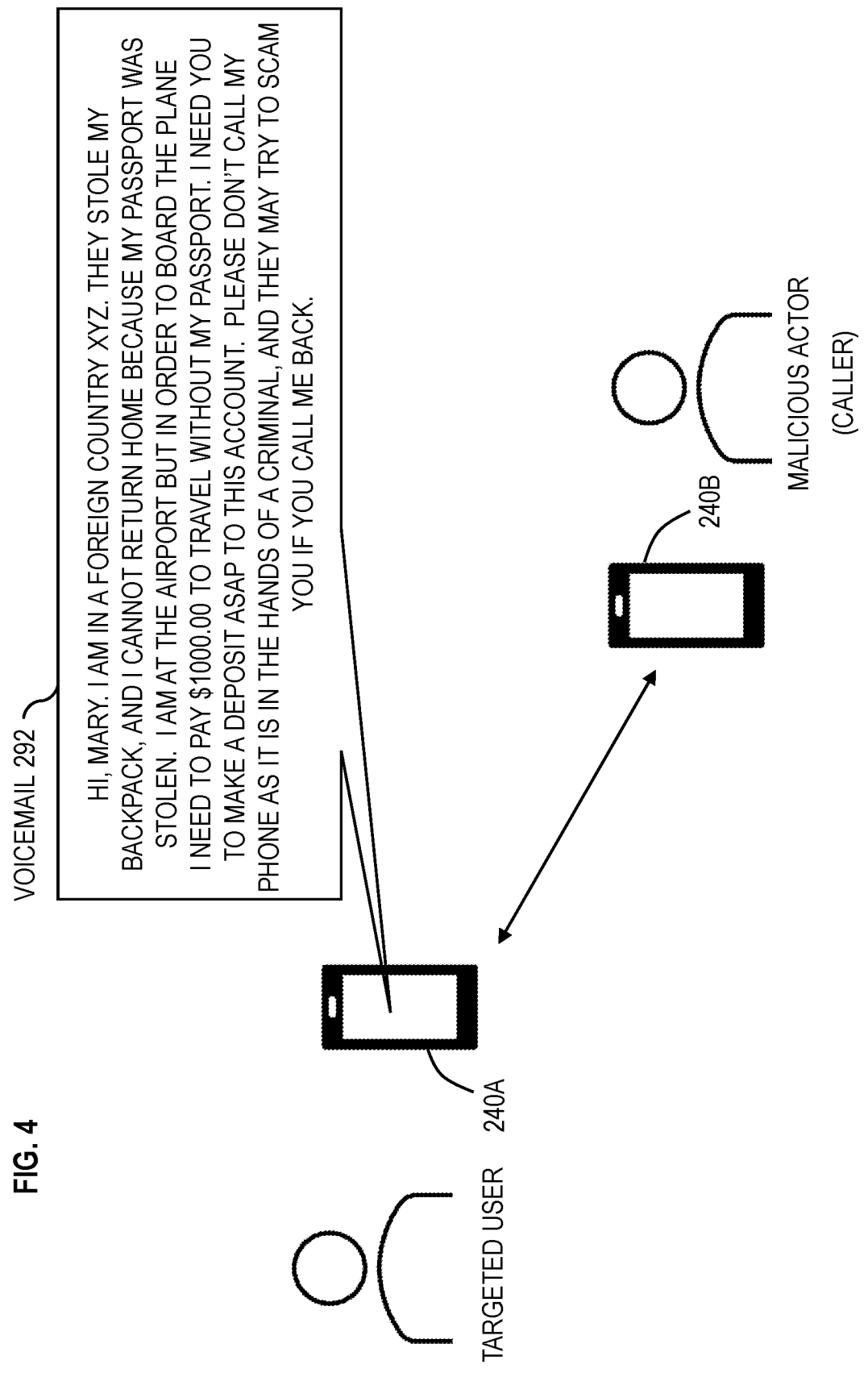

VOICEMAIL 292

HI, MARY. I AM IN A FOREIGN COUNTRY XYZ. THEY STOLE MY BACKPACK, AND I CANNOT RETURN HOME BECAUSE MY PASSPORT WAS STOLEN. I AM AT THE AIRPORT BUT IN ORDER TO BOARD THE PLANE I NEED TO PAY $1000.00 TO TRAVEL WITHOUT MY PASSPORT. I NEED YOU TO MAKE A DEPOSIT ASAP TO THIS ACCOUNT. PLEASE DON'T CALL MY PHONE AS IT IS IN THE HANDS OF A CRIMINAL, AND THEY MAY TRY TO SCAM YOU IF YOU CALL ME BACK.

TARGETED USER    240A

240B

MALICIOUS ACTOR (CALLER)

FIG. 5

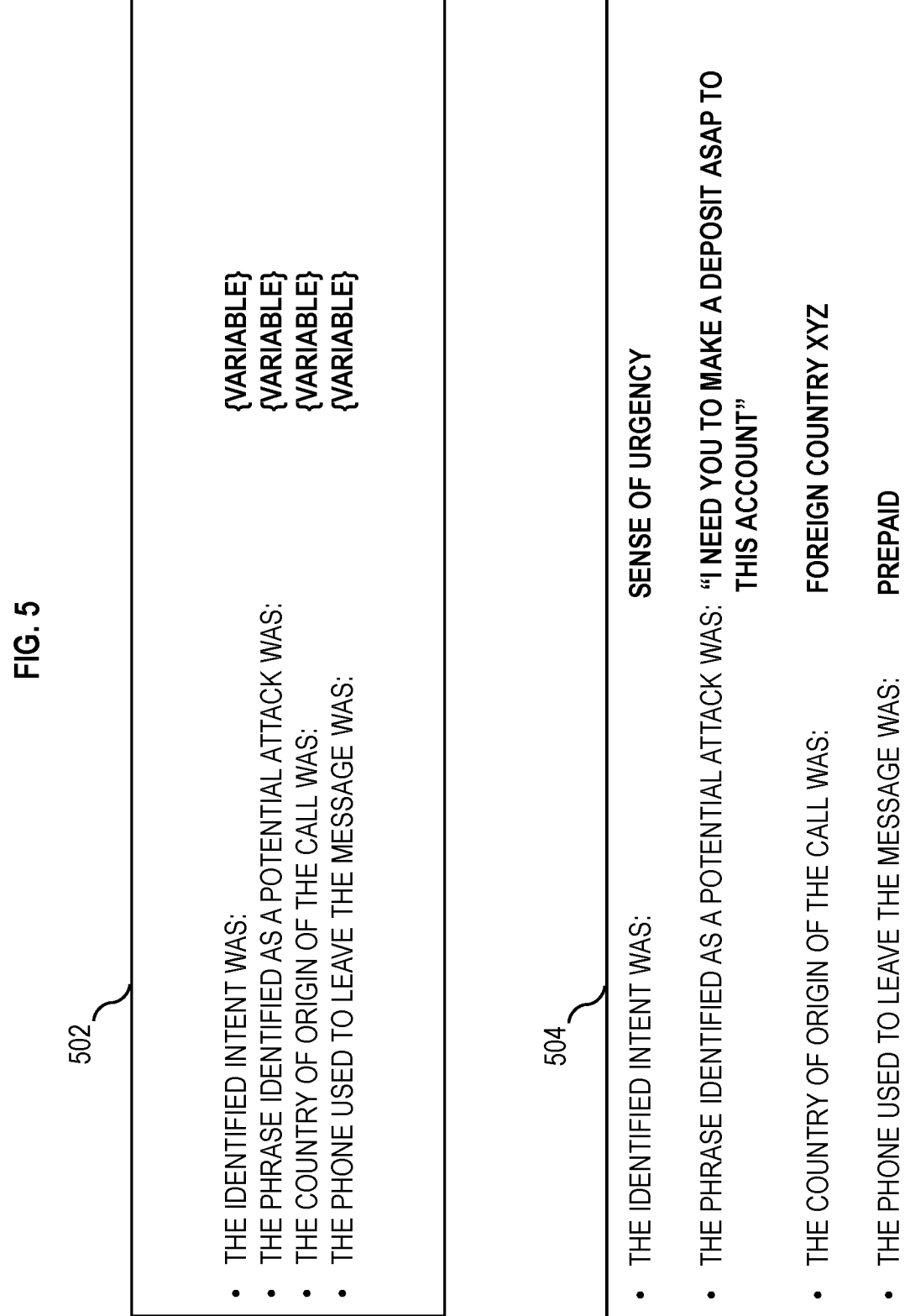

502

- THE IDENTIFIED INTENT WAS:      {VARIABLE}
- THE PHRASE IDENTIFIED AS A POTENTIAL ATTACK WAS:      {VARIABLE}
- THE COUNTRY OF ORIGIN OF THE CALL WAS:      {VARIABLE}
- THE PHONE USED TO LEAVE THE MESSAGE WAS:      {VARIABLE}

504

- THE IDENTIFIED INTENT WAS:      SENSE OF URGENCY
- THE PHRASE IDENTIFIED AS A POTENTIAL ATTACK WAS:      "I NEED YOU TO MAKE A DEPOSIT ASAP TO THIS ACCOUNT"
- THE COUNTRY OF ORIGIN OF THE CALL WAS:      FOREIGN COUNTRY XYZ
- THE PHONE USED TO LEAVE THE MESSAGE WAS:      PREPAID

FIG. 6

| TYPE OF PRINCIPLE | DESCRIPTION |
|---|---|
| Liking | The act of saying yes to something you know and like; for example, a social engineer presenting himself as helpful and empathetic toward the victim in a password reset process. |
| Reciprocity | Repaying an earlier action in kind; for example, conveying to a victim that they have detected suspicious activities in the victim's credit card account while encouraging the victim to reset the password with their assistance. |
| Social Proof | The use of endorsement; for example, stating that, due to recent suspicious activities, new security requirements are issued and must be complied by all account holders. |
| Consistency | Leveraging the desire of individuals to be consistent with their words, belief, and actions; for example, reminding users that they have to comply with a password reset policy as they have previously done. |
| Authority | Responding to others with more experience, knowledge, or power; for example, an email signed by a Senior Vice President of a bank requesting customers to reset their account passwords. |
| SENSE OF URGENCE/ Scarcity | Something being valuable when it is perceived to be rare or available for a limited time; for example, giving a user 24-h notice before they deactivate the user's account. |
| Unity | Shared identity between the influencer and the influenced |

IN RESPONSE TO RECEIVING A VOICE MESSAGE, DETERMINE AN INTENT OF THE VOICE MESSAGE 702

DETERMINE THAT THE INTENT RELATES TO A PERSUASION TECHNIQUE 704

CAUSE AN AUDIO WARNING TO BE PROVIDED ABOUT THE VOICE MESSAGE 706

PREVENTING DEEP FAKE VOICEMAIL SCAMS

BACKGROUND

The present invention generally relates to computer systems, and more specifically, to computer-implemented methods, computer systems, and computer program products configured and arranged to prevent deep fake voicemail scams.

Cybersecurity is the practice of protecting critical systems and sensitive information from digital attacks. Cybersecurity is also known as information technology (IT) security. Cybersecurity measures are designed to combat threats against networked systems and applications, whether those threats originate from inside or outside of an organization. Further, cybersecurity protects against attack by malicious actors that may result in unauthorized information disclosure, theft of data or other valuable resources, or damage to hardware, software, or data. Cybersecurity measures also protect against the disruption or misdirection of services.

SUMMARY

Embodiments of the present invention are directed to computer-implemented methods for preventing deep fake voicemail scams. A non-limiting computer-implemented method includes, in response to receiving a voice message, determining an intent of the voice message. The method includes determining that the intent relates to a persuasion technique and causing a warning to be provided about the voice message.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 3A and 3B are a flowchart of a computer-implemented method for dynamically preventing deep fake voicemail scams and performing security actions that analyze the voicemail and warn the targeted user of the scam according to one or more embodiments of the present invention;

FIG. 4 depicts an example communication to a targeted user from a malicious actor according to one or more embodiments of the present invention;

FIG. 5 depicts an example data structure that can be utilized for a new warning audio according to one or more embodiments of the present invention;

FIG. 6 depicts example persuasion techniques and their corresponding description according to one or more embodiments of the present invention;

DETAILED DESCRIPTION

Figure 1:
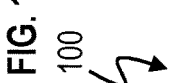
FIG. 1 depicts a block diagram of an example computer system for use in conjunction with one or more embodiments of the present invention.

One or more embodiments are configured and arranged to dynamically prevent deep fake voicemail scams. One or more embodiments provide an opt-in system that uses an algorithm to detect the intent of a given voicemail received by a targeted recipient. The opt-in system contrasts the identified intent against a plurality of persuasion principles to detect potential traits of social engineering attacks. Also, the opt-in system gathers data from the caller when the potential traits of social engineering attacks are found on a given voicemail left by the caller. The caller can be a sender of a voicemail message to the targeted recipient. In one or more embodiments, the social engineer, as the potential attacker, is most likely using technology to make it appear as if the targeted recipient missed a call when in reality a call was never placed, and instead a voicemail was sent. The opt-in system creates an audio file including relevant information about the caller, who is the potential attacker, and appends the audio file at the beginning of the voicemail. Social engineering is a manipulation technique that exploits human error to gain private information, access, and/or valuables. In cybercrime, these "human hacking" scams tend to lure unsuspecting users into exposing data, spreading malware infections, and/or giving access to restricted computer systems. As discussed herein, one or more embodiments provide cybersecurity to protect against social engineering attacks.

As the world of artificial intelligence and deep fake technology grows more complex, the risk that deep fakes pose to firms and individuals grows increasingly concerning. This growing sophistication of the latest software and algorithms has allowed malicious hackers, scammers, and cyber-criminals working tirelessly behind the scenes to stay one step ahead of the authorities, making the threat of attacks increasingly difficult to both prepare for and defend against. Most readers are generally familiar with the nature of traditional cyberattacks that involve system hacking, viruses, and ransomware. However, the realm of cybercrime has taken a vast leap forward as individuals and companies fall victim to scams built upon a phone call using deep fake audio technology.

In one scenario, scammers can generate voices that mimic loved ones using artificial intelligence in order to obtain personal information, resources, etc., from the targeted victim. This is an attempt to play on the deep feelings of love and compassion of unsuspecting victims who may believe a friend or family member needs help. Using artificial intelligence, voice cloning is a technology that imitates a person's voice and replicates it to use for voice assistance.

Previously, cloning a voice required hours of recorded speech to build a collection of datasets that could be used to build a new voice model. However, now it is possible in seconds. The mother lode of prerecorded voice and videos is found on social media. Voices can also be picked up at meetings and rallies, making it easy for malicious cyberattackers to gather voice samples and then use it for nefarious purposes. Many people today continue to post a portion of their lives on social media, including recordings of their voice and image as well as travel information. All of this readily available information makes it easy for cyberattackers to take advantage of current technology to perpetrate fraud on unsuspecting loved ones.

Technical solutions and benefits include a novel method and system for dynamically preventing deep fake voicemail scams, according to one or more embodiments. A cybersecurity service is executed in which the service provides users with an opt-in system that uses intent detection algorithms to find patterns of persuasion techniques in voice messages. Upon detection of a persuasion technique to scam the targeted user or victim, the system is configured to generate and play an audio file as a warning to the targeted user or victim along with other alerts, thereby preventing the targeted user from conveying sensitive information to the malicious cyberattacker.

One or more embodiments described herein can utilize machine learning techniques to perform tasks, such as classifying a feature of interest. More specifically, one or more embodiments described herein can incorporate and utilize rule-based decision making and artificial intelligence (AI) reasoning to accomplish the various operations described herein, namely classifying a feature of interest. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," "a trained classifier," and/or "trained machine learning model") can be used for classifying a feature of interest, for example. In one or more embodiments, machine learning functionality can be implemented using an Artificial Neural Network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional Neural Networks (CNN) are a class of deep, feed-forward ANNs that are particularly useful at tasks such as, but not limited to analyzing visual imagery and natural language processing (NLP). Recurrent Neural Networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
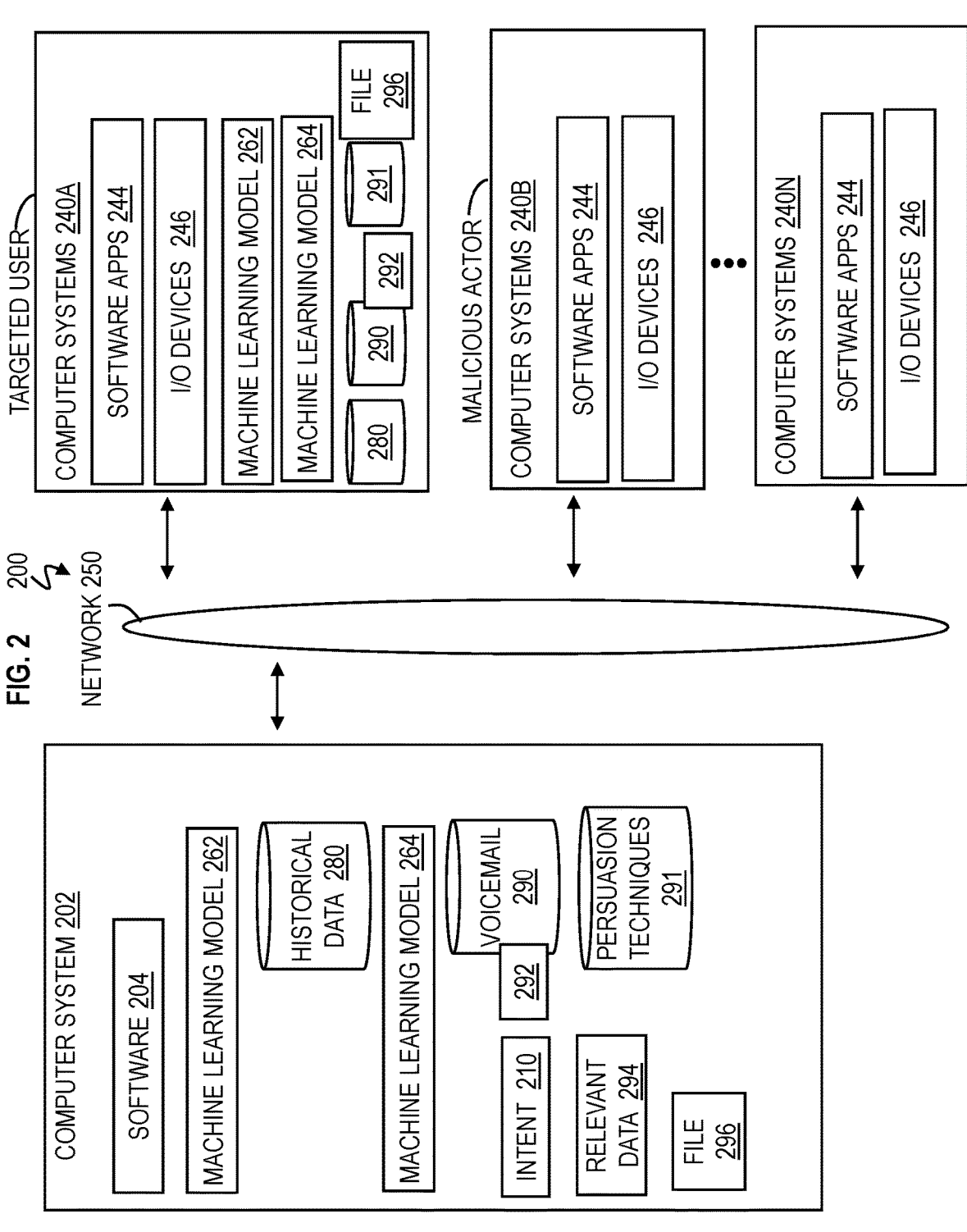
FIG. 2 depicts a block diagram of an example system configured to prevent deep fake voicemail scams and perform security actions that analyze the voicemail and warn the targeted user of the scam according to one or more embodiments of the present invention.

FIG. 2 depicts a block diagram of an example system 200 configured to prevent deep fake voicemail scams and perform security actions that analyze the voicemail and warn the potential victim or targeted user of the scam according to one or more embodiments. The system 200 includes a computer system 202 configured to communicate over a network 250 with many different computer systems, such as a computer system 240A, a computer system 240B, a computer system 240N. The computer systems 240A, 240B, through 240N can generally be referred to as computer systems 240 and are utilized for communication between one another, such as for phone calls, video calls, messaging including short message service (SMS) and multimedia messaging service (MMS), etc. The computer systems 240 can include a telephone for receiving and placing phone calls. The computer systems 240 can be representative of mobile devices including smart devices, etc. A smart device is an electronic device, generally connected to other devices or networks via different wireless protocols that can operate to some extent interactively. Several notable types of smart devices are smartphones, smart speakers, tablets, smartwatches, smart bands, smart glasses, and many others. The network 250 can be a wired and/or wireless communication network, and the communication network includes a telecommunications network, the public switched telephone network (PTSN), voice over IP (VOIP) network, etc. The communication network includes cellular networks, satellite networks, etc.

For explanation purposes and not limitation, some example scenarios may identify that a user of computer system 240A is the targeted recipient or potential victim of a cybersecurity attack such as a fraud, a scam, etc. For example, the cybersecurity attack has been social engineered for the targeted recipient. In the example scenarios, the user of the computer system 240B is the malicious actor, potential attacker, scammer, etc., committing the fraud or scam against the targeted user. An example scenario may be that the malicious actor of computer system 240B leaves, sends, etc., an unsolicited voicemail message for the targeted user of the computer system 240A in order to extract sensitive information from the targeted user, which is utilized to commit fraud against the targeted user. As a result, the sensitive information could be utilized by the malicious attacker to gain access improperly or illegally to servers on which confidential material can be accessed, financial accounts can be accessed, unauthorized transactions can be made, etc. The voicemail message may require the targeted user to take actions that defraud the targeted user.

The computer systems 240 can include various software and hardware components including software applications (apps) 244 for communicating with one another over the network 250 as understood by one of ordinary skill in the art. The computer systems 240 can include one or more input/output (I/O) devices 246 including cameras, a microphone, a display, and other peripherals. The computer system 202, computer systems 240, software applications 244, software 204, machine learning model 262, machine learning model 264, etc., can include functionality and features of the computer system 100 in FIG. 1 including various hardware components and various software applications such as software 111 which can be executed as instructions on one or more processors 101 in order to perform actions according to one or more embodiments of the invention. The machine learning model 262, machine learning model 264, software applications 244, and the software 204 can include, be integrated with, and/or call other pieces of software, algorithms, application programming interfaces (APIs), etc., to operate as discussed herein.

The computer system 202 may be representative of numerous computer systems and/or distributed computer systems configured to provide security services to users of the computer systems 240. The computer system 202 can be part of a cloud computing environment such as a cloud computing environment 50 depicted in FIG. 8, as discussed further herein. The computer systems 202 can be operated by telecommunication companies that have access to data of both the calling party and called party in one or more embodiments. Telecommunications, also known as telecom, is the exchange of information over large distances using various technologies. Telecommunications includes various sectors, but they generally include a transmitter and a receiver. The medium of signal transference can be via various means including fiber, electromagnetic fields, light, cable, satellite, etc. Telecommunication companies are business that provide services such as phone, internet, cable, and wireless communications.

Figure 3B:
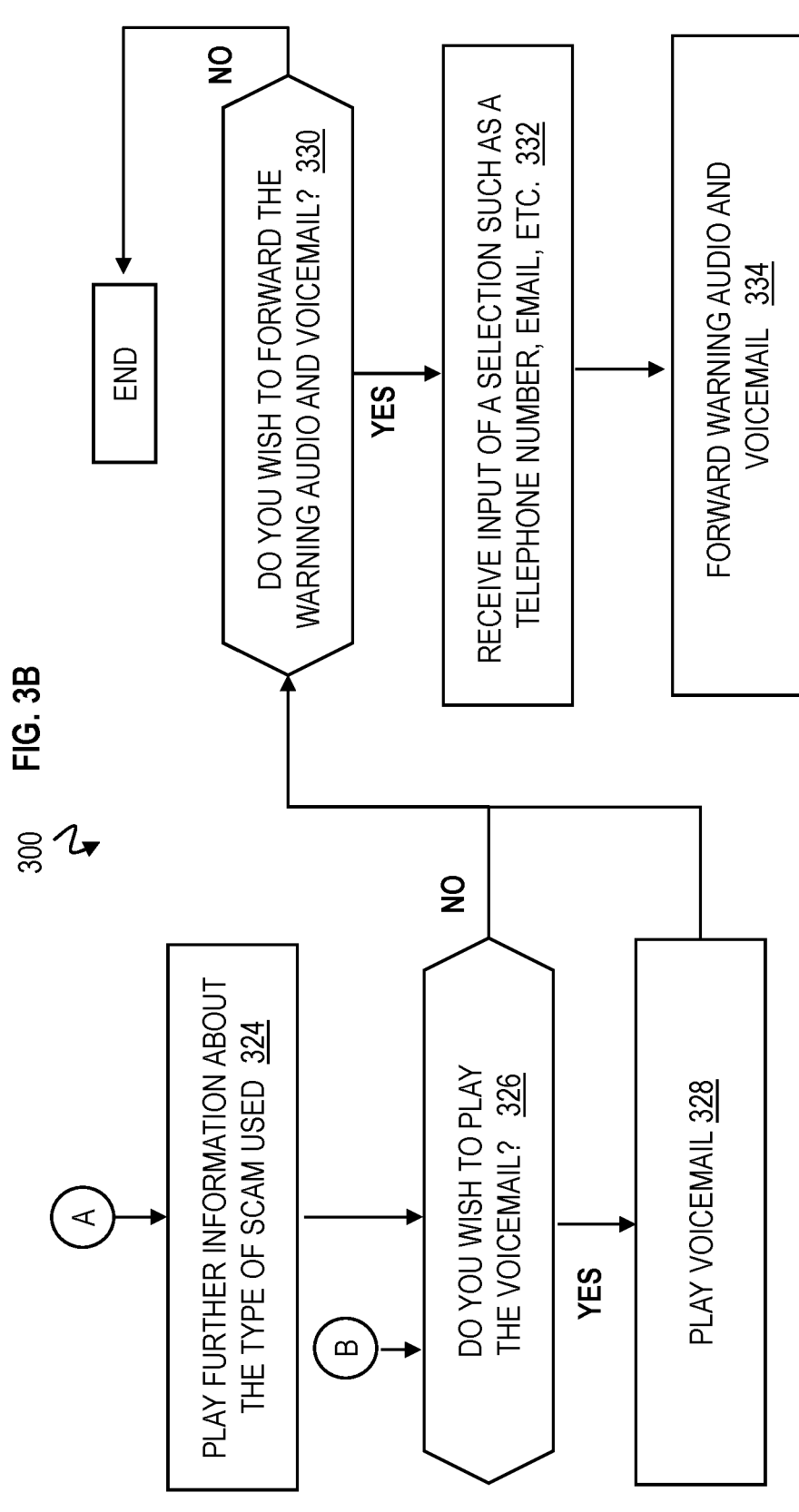

FIGS. 3A and 3B are a flowchart of a computer-implemented method 300 for dynamically preventing deep fake voicemail scams and performing security actions that analyze the voicemail and warn the potential victim or targeted recipient of the scam according to one or more embodiments. The computer-implemented method 300 can be executed by the computer system 202 on behalf of and in conjunction with the computer system 240A in an example scenario. In one or more embodiments, the computer system 240A can communicate with the computer system 202 in order to cause the computer system 202 to assist with execution of one or more tasks, for example, in a client server relationship. Reference can be made to any figures discussed herein.

At block 302 of the computer-implemented method 300, the software 204 of computer system 202 is configured to detect that a voicemail 292 has been received for the computer system 240A from the computer system 240B. The voicemail 292 can be stored in a repository 290 of voicemail messages for the targeted user of computer system 240A. The voicemail 292 can also be stored on the computer system 240A of the targeted user. In one or more embodiments, the software 204 can communicate with the software applications 244 of the computer system 240A to recognize that a voicemail has be left for the targeted user of computer system 240A. In one or more embodiments, the software applications 244 may include a phone application for the computer system 240A.

In an example scenario, the caller is the malicious actor of the computer system 240B as depicted in FIG. 4. FIG. 4 illustrates an example scenario in which the caller of computer system 240B leaves the voicemail 292 on the computer system 240A (e.g., a phone) of the targeted recipient. In some cases, the caller of computer system 240B can send the voicemail 292 directly to the computer system 240A of the targeted recipient without ringing the phone, in order to avoid a two-way communication that may expose the scam. In one or more embodiments, the targeted recipient of computer system 240A has opted in for the security services that dynamically prevents deep fake voicemail scams and performs security actions that analyze the voicemail and warn the potential victim or targeted recipient of the scam.

Referring to FIG. 3A, at block 304, the software 204 of computer system 202 is configured to convert and/or cause the speech/audio of the voicemail 292 to be converted to text for further analysis. Any known speech-to-text algorithm can be used. In one or more embodiments, the analysis can be performed on the speech/audio.

At block 306, the software 204 of computer system 202 is configured to employ, call, and/or be integrated with an intent detection engine, for example, a machine learning model 262 trained to determine the intent 210 of the voicemail 292. Intent detection, intent recognition, etc., is a text classification task that aims to identify the user's goal or intention from their natural language input. Intent detection is a component of natural language understanding systems, such as chatbots and dialogue systems. Intent recognition, also commonly referred to as intent classification, uses machine learning and natural language processing to associate text data and expression to a given intent. In other words, intent recognition takes a given query as an input and associates the query to the target class. The machine learning model 262 can include various known machine learning models for intent recognition/detection as understood by one of ordinary skill in the art. Various well-known models can be utilized for determining intent including but not limited to bidirectional encoder representations from transformers (BERT) model, robustly optimized BERT pretraining approach (ROBERTa) model, capsule neural networks for intent detection, dual sentence encoders for intent detection, attention encoder-decoder neural networks, joint model with recurrent slot label context, CNN-transformer-based network for natural language understanding (CTRAN), bidirectional interrelated model for joint intent detection and slot filling (BLSTM)/slot filling intent detection (SF-ID), global-locally graph interaction network (GL-GIN), IBM Watson®, etc.

At block 308, the software 204 of computer system 202 is configured to compare the intent 210 of the voicemail 292 with a database of persuasion techniques in repository 291 to determine if the intent 210 correlates to and/or matches any of the persuasion techniques in the repository 291. A match between the intent 210 and any one or more of the persuasion techniques may have greater than a predetermined probability for being a match. For example, a match between the intent 210 and any of the persuasion techniques may have a probability of 50% or more, a probability of 60% or more, a probability of 75% or more, etc. In order to determine a correlation or match, any known techniques for comparing the text of the intent 210 to the text of the persuasion techniques in the repository 291 can be utilized, as understood by one of ordinary skill in the art. There are several algorithms and machine learning models that can be utilized for text similarity. Example algorithms can include cosine similarity, Euclidean distance, Jaccard index, Levenshtein distance, etc. Additionally, pre-trained language models can be utilized for text similarity tasks such as BERT, RoBerta, IBM Watson®, etc.

At block 310, the software 204 of computer system 202 is configured to determine whether any persuasion techniques (e.g., a scam) were detected in the comparison.

In one or more embodiments, in parallel to blocks 306, 308, and 310 and/or as an alternative to blocks 306, 308, and 310, the software 204 is configured to call, employ, and/or be integrated with a machine learning model 264. The software 204 is configured to parse the text of the voicemail 292 and provide the text to the machine learning model 264 to determine when the voicemail 292 includes one or more persuasion techniques (e.g., a scam). The machine learning model 264 can be trained on training data that includes a historical database of known scams and fraud in the repository 280. The training data can include text of scams using persuasion techniques that are social engineered for potential victims. In some cases, the training data can include past and present deep fake voicemails that have been created to target users. The machine learning model 264 can be trained on training data of numerous voicemail scams and fraud that have been labeled for supervised training. A feature vector can be generated for each historical scam and fraud, and each of the feature vectors can be labeled scam/fraud in the training data of the repository 280 such that the machine learning algorithm(s) of the machine learning model is trained. The feature vector is an ordered list of numerical properties of observed phenomena, and the feature vector represents input features to a machine learning model that makes a prediction. Also, in the training data of repository 280, there may be some feature vectors of voicemails that are not scams and fraud, and such feature vectors can be labeled as a normal voicemail (i.e., not a scam/fraud).

Additionally, when classifying a voicemail as a scam or fraud, the machine learning model can output a probability of the likelihood of being a scam and fraud. In one or more embodiments, the machine learning model can utilize any known artificial intelligence technique, which may include a pretrained model that is further trained with the training data of the repository 280, for comparing text of a given voicemail to known scams and fraud for social engineering with persuasion techniques, in order to determine if a persuasion technique is detected. In one or more embodiments, the machine learning model 264 and/or the software 204 may include, call, and/or employ any known natural language processing (NLP) model for processing the voicemail and determining whether the voicemail is a scam or fraud using a socially engineered persuasion technique. The NLP model may be pre-trained and can be further trained on the training data of scams and fraud from voicemails to determine when a given voicemail is a scam or fraud.

In one or more embodiments, the decision block 310 is affirmative (YES) when there is a match to any of the persuasion techniques in the repository 291 for block 308 and when the machine learning model 264 determines that the voicemail 292 is a scam/fraud. In this case, the machine learning model 264 acts as a check on the blocks 306 and 308.

In one or more embodiments, the decision block 310 is affirmative (YES) when there is a match to any of the persuasion techniques in the repository 291 for block 308 and/or when the machine learning model 264 determines that the voicemail 292 is a scam/fraud. In this case, finding the persuasion technique via blocks 306 and 308 or the machine learning model 264 can result in the affirmative for the decision block 310.

Referring to FIG. 3A, if (NO) there is not a persuasion technique detected, the software 204 of computer system 202 is configured to cause the voicemail 292 to play in a normal manner for the targeted user of computer system 240A at block 312. The targeted user can listen to the voicemail 292 on the computer system 240A without a warning audio being played.

If (YES) there is at least one or more persuasion techniques detected in the intent 210, the software 204 of computer system 202 is configured to collect the relevant data 294 about the caller of computer system 240B at block 314. To improve detection and avoid false positives, the software 204 can gather relevant information about the attacker (the person who sent the voicemail) and provide that relevant information to the potential victim to help him/her determine if the voicemail 292 is real or a scam. This relevant data 294 can include any one or more of the following: the number from which the voicemail originated; location including country; phone type such as public, mobile, prepaid, etc.; history of this phone number reported as fraud; and any other data related to the caller or telephone number. As noted herein, in one or more embodiments, a portion of the security system can be running on the computer system 202 of a telecommunication provider, and therefore the computer system 202 can easily capture all the relevant data. In one or more embodiments, the relevant data 294 can also be harvested using a secure API.

At block 316, the software 204 of computer system 202 is configured to create a warning audio file 296 that includes the relevant data 294 about the malicious actor, which is the caller on computer system 240B. In one or more embodiments, the software 204 can convert the warning audio of the warning audio file 296 to a displayable warning message. Additionally, the software 204 can include a default warning message that is displayed.

At blocks 318 and 320, the software 204 of computer system 202 is configured to append the new warning audio of the audio file 296 at the beginning of the voicemail 292 and cause the new warning audio to be played and/or the new warning message to be displayed prior to playing the voicemail 292. Any format can be utilized for the new warning audio of the audio file 296 and the new warning message. FIG. 5 depicts an example data structure 502 of a template that can be utilized for the new warning audio that is heard by and/or the new warning message that is displayed to the targeted recipient according to one or more embodiments. The template is empty in the data structure 502. After comprising the template, a data structure 504 in FIG. 5 depicts the template filled in with portions of the relevant data 294. Following the example scenario, the data structure 504 may include the following: the identified intent was: sense of urgency; the phrase identified as a potential attach was: "I need you to make a deposit ASAP to this account"; the country or origin of the call was: foreign country XYZ; and the phone used to leave the message was: prepaid.

At block 322, the software 204 of computer system 202 is configured to inquire whether the targeted user wants more information about the scam.

Referring to FIG. 3B, at block 324 of the computer-implemented method 300, if (YES) the targeted user wishes to hear further information about the type of scam, the software 204 of computer system 202 is configured to cause further information about the type of scam to be played to the computer system 240A of the targeted user of computer system 240A. FIG. 6 illustrates a few examples of several types of persuasion techniques and their corresponding description. In one or more embodiments, the software 204 can cause all of the types of persuasion techniques to be played on the speakers of the computer system 240A for the targeted user, in order to provide the user with information to guard against the present and future scams. In one or more embodiments, since the type of persuasion technique being utilized is the sense of urgency/scarcity, the software 204 may cause the description for the sense of urgency/scarcity to be played for the targeted user of computer system 240A. Additionally, the software 204 can provide the targeted user with a selectable option to hear the description of other types of persuasion techniques and play them accordingly.

At block 326, the software 204 of computer system 202 is configured to inquire whether the targeted user wishes to play the voicemail 292. If (YES) the targeted user wishes to play the voicemail 292, the software 204 is configured to cause the voicemail 292 to be played to the targeted user of computer system 240A at block 328.

At block 330, if (NO) the targeted user does not wish to play the voicemail 292 and/or after playing the voicemail 292, the software 204 of computer system 202 is configured to inquire whether the targeted user wishes to forward the warning audio of the audio file 296 and the voicemail 292, for example, to a family member, a trusted friend, the police, etc., for review and assistance. If not, the flow ends.

At blocks 332 and 324, if (YES) the targeted user does wish to forward the warning audio of the audio file 296 and the voicemail 292, the software 204 of computer system 202 is configured to receive user input of a selection such as a telephone number, a contact, an email address, etc., and forward the warning audio of the audio file 296 and the voicemail 292 accordingly.

In one or more embodiments, the targeted user of the computer system 240A is provided with a selectable option to opt in for the security services. In one or more embodiments, the software 204 is configured to provide the selectable option to opt in for security services via voice prompts, displayed selectable options, etc.

Figure 7:
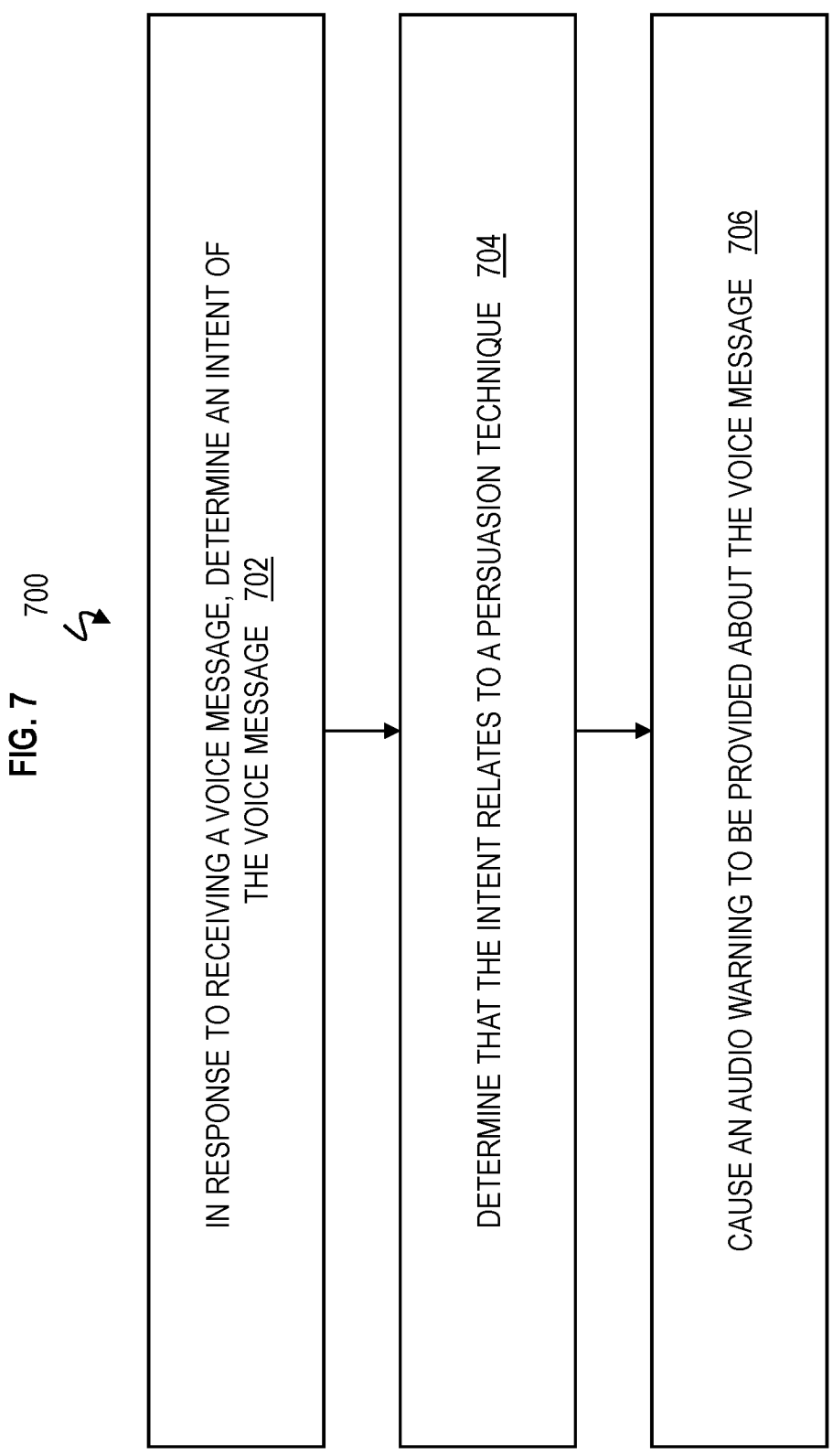
FIG. 7 is a flowchart of a computer-implemented method for dynamically preventing deep fake voicemail scams and performing security actions that analyze the voicemail and warn the potential victim or targeted user of the scam according to one or more embodiments of the present invention.

FIG. 7 is a flowchart of a computer-implemented method 700 for dynamically preventing deep fake voicemail scams and performing security actions that analyze the voicemail and warn the potential victim or targeted user of the scam according to one or more embodiments. The computer-implemented method 700 can be executed by the computer system 202 and cause actions to be performed on the computer system 240A of the targeted user who receives a voicemail 292 in the example scenario. In one or more embodiments, the computer system 240A can communicate with the computer system 202 in order to cause the computer system 202 to assist with execution of one or more tasks, for example, in a client server relationship. In one or more embodiments, tasks of the computer system 202 can be triggered each time a new voicemail is received. Reference can be made to any figures discussed herein.

At block 702 of computer-implemented method 700, in response to receiving a voice message (e.g., voicemail 292), the software 204 is configured to determine an intent 210 of the voice message (e.g., voicemail 292). At block 704, the software 204 is configured to determine that the intent 210 relates to a persuasion technique, for example, at least one persuasion technique in the repository 291. At block 706, the software 204 is configured to cause an audio warning of, for example, the audio file 296, to be provided about the voice message for the computer system 240A of the targeted user.

In one or more embodiments, the audio warning of audio file 296 identifies a type of the persuasion technique being utilized in the voice message (e.g., voicemail 292). The audio warning of the audio file 296 includes data (e.g., relevant data 294) related to caller (e.g., malicious actor of computer system 240B) that provided the voice message.

The software 204 of computer system 202 is configured to provide details about the persuasion technique, in response to a request for the details. For example, the targeted user of computer system 240A can verbally answer the question discussed at block 322 of FIG. 3A, select a button of the phone, etc., in order to request further details about the persuasion technique. The computer system 240A can be caused to play any of the example further details depicted in FIG. 6.

Determining that the intent 210 relates to the persuasion technique includes comparing the intent to a plurality of persuasion techniques and determining that the intent correlates to and/or matches the persuasion technique of the plurality of persuasion techniques. Example persuasion techniques can be stored in the repository 291.

The software 204 of computer system 202 is configured to forward the audio warning of the audio file 296 and the voice message to a contact, in response to receiving a request to forward to the contact. For example, the targeted user of computer system 240A can verbally answer the question (e.g., YES) discussed at block 330 of FIG. 3B, select a button of the phone, etc., in order to request that the audio warning of the audio file 296 and the voice message be forwarded to a trusted person, such as the user of computer system 240N. The audio warning is played prior to playing the voice message.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
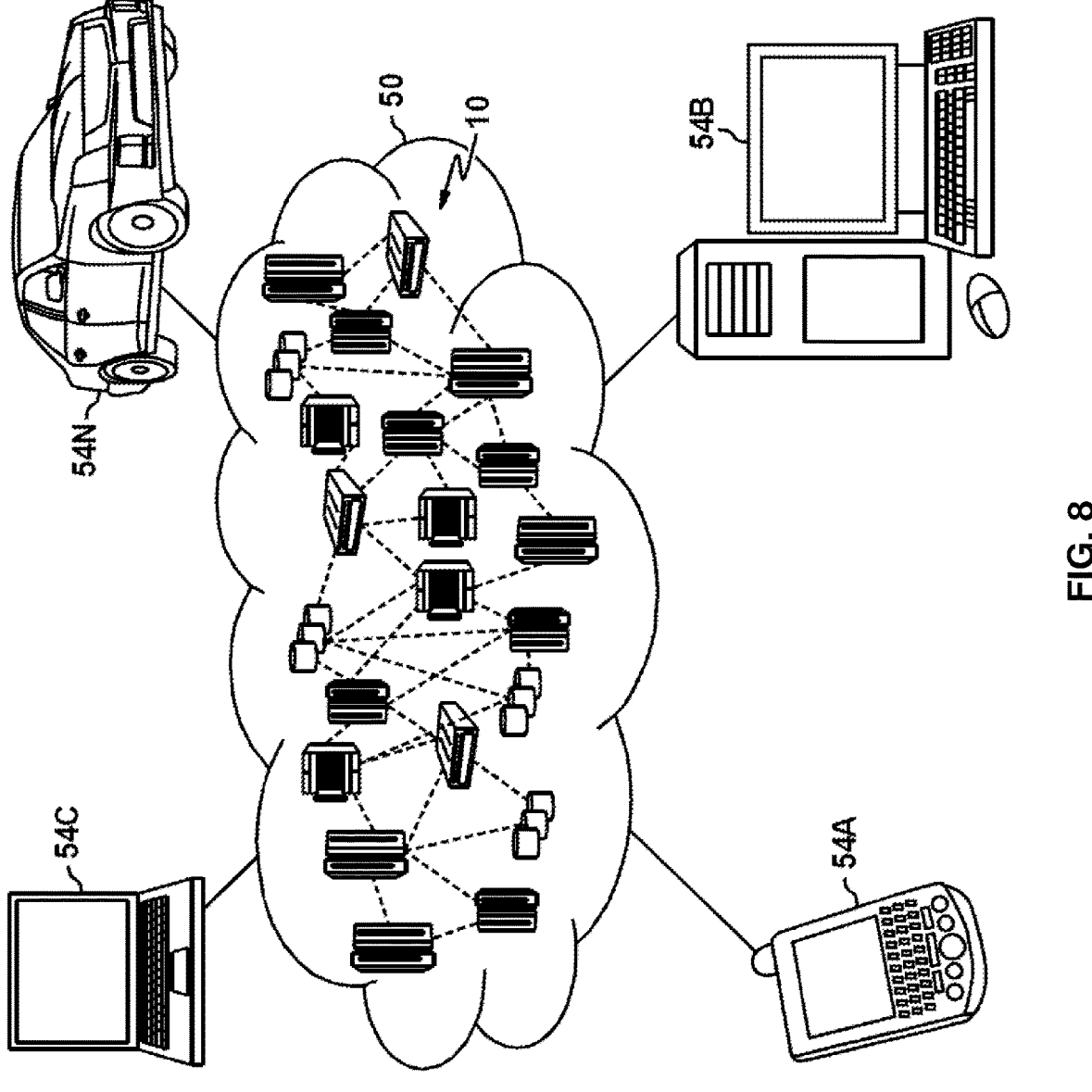
FIG. 8 depicts a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
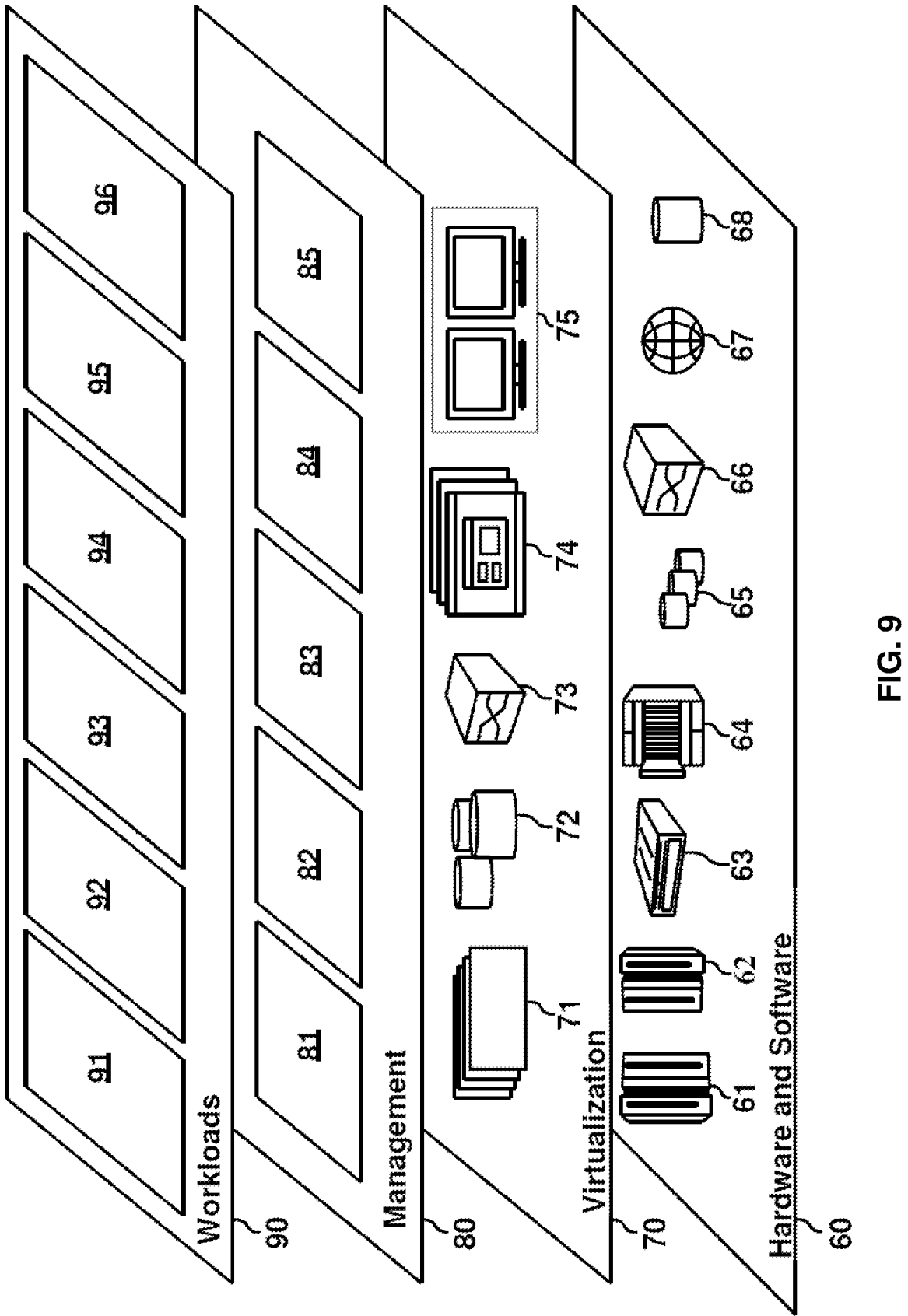
FIG. 9 depicts abstraction model layers according to one or more embodiments of the present invention.

Referring now to FIG. 9, a set of functional abstraction layers provided by cloud computing environment 50 (depicted in FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
in response to receiving a voice message, determining an intent of the voice message;
determining that the intent relates to a persuasion technique; and
causing a warning to be provided about the voice message, wherein the warning comprises data related to a caller that provided the voice message, wherein the data related to the caller comprises a country of the caller and a phone type of the caller.

2. The computer-implemented method of claim 1, wherein the warning identifies a type of the persuasion technique being utilized in the voice message.

3. The computer-implemented method of claim 1, wherein a file is generated comprising the data related to the caller, and wherein the file is played as part of the warning prior to playing the voice message.

4. The computer-implemented method of claim 1, further comprising providing details about the persuasion technique, in response to a request for the details.

5. The computer-implemented method of claim 1, wherein determining that the intent relates to the persuasion technique comprises comparing the intent to a plurality of persuasion techniques and determining that the intent correlates to the persuasion technique of the plurality of persuasion techniques.

6. The computer-implemented method of claim 1, further comprising forwarding the warning and the voice message to a contact, in response to receiving a request to forward to the contact.

7. The computer-implemented method of claim 1, wherein the warning is played prior to playing the voice message; and
wherein the phone type is a description of a phone utilized by the caller to leave the voice message.

8. A system comprising:
a memory having computer readable instructions; and
one or more processors for executing the computer readable instructions, the computer readable instructions when executed cause the one or more processors to perform operations comprising:
in response to receiving a voice message, determining an intent of the voice message;
determining that the intent relates to a persuasion technique; and
causing a warning to be provided about the voice message, wherein the warning comprises data related to a caller that provided the voice message, wherein the data related to the caller comprises a country of the caller and a phone type of the caller.

9. The system of claim 8, wherein the warning identifies a type of the persuasion technique being utilized in the voice message.

10. The system of claim 8, wherein an application programming interface retrieves the data related to the caller.

11. The system of claim 8, wherein the one or more processors perform the operations further comprising providing details about the persuasion technique, in response to a request for the details.

12. The system of claim 8, wherein determining that the intent relates to the persuasion technique comprises comparing the intent to a plurality of persuasion techniques and determining that the intent correlates to the persuasion technique of the plurality of persuasion techniques.

13. The system of claim 8, wherein the one or more processors perform the operations further comprising forwarding the warning and the voice message to a contact, in response to receiving a request to forward to the contact.

14. The system of claim 8, wherein the warning is played prior to playing the voice message.

15. A computer program product comprising a computer readable storage medium having program instructions embodied therewith, the program instructions executable by one or more processors to cause the one or more processors to perform operations comprising:

in response to receiving a voice message, determining an intent of the voice message;

determining that the intent relates to a persuasion technique; and causing a warning to be provided about the voice message, wherein the warning comprises data related to a caller that provided the voice message, wherein the data related to the caller comprises a country of the caller and a phone type of the caller.

16. The computer program product of claim 15, wherein the warning identifies a type of the persuasion technique being utilized in the voice message.

17. The computer program product of claim 15, wherein the one or more processors perform the operations further comprising providing details about the persuasion technique, in response to a request for the details.

18. The computer program product of claim 15, wherein determining that the intent relates to the persuasion technique comprises comparing the intent to a plurality of persuasion techniques and determining that the intent correlates to the persuasion technique of the plurality of persuasion techniques.

19. The computer program product of claim 15, wherein the one or more processors perform the operations further comprising forwarding the warning and the voice message to a contact, in response to receiving a request to forward to the contact.

* * * * *